(12) United States Patent
Furukawa

(10) Patent No.: US 10,477,236 B2
(45) Date of Patent: Nov. 12, 2019

(54) IMAGE ACQUISITION DEVICE, IMAGE PROCESSING DEVICE, IMAGE PROCESSING METHOD, IMAGE PROCESSING PROGRAM, AND STORAGE MEDIUM FOR GENERATING HIGH RESOLUTION IMAGE FROM LOW RESOLUTION IMAGES

(71) Applicant: OLYMPUS CORPORATION, Hachioji-shi, Tokyo (JP)

(72) Inventor: Eiji Furukawa, Saitama (JP)

(73) Assignee: OLYMPUS CORPORATION, Tokyo (JP)

( * ) Notice: Subject to any disclaimer, the term of this patent is extended or adjusted under 35 U.S.C. 154(b) by 99 days.

(21) Appl. No.: 15/809,947

(22) Filed: Nov. 10, 2017

(65) Prior Publication Data
US 2018/0084274 A1 Mar. 22, 2018

Related U.S. Application Data

(63) Continuation of application No. PCT/JP2015/064578, filed on May 21, 2015.

(51) Int. Cl.
*H04N 19/53* (2014.01)
*H04N 19/43* (2014.01)
(Continued)

(52) U.S. Cl.
CPC ............ *H04N 19/53* (2014.11); *G06T 1/0007* (2013.01); *G06T 5/50* (2013.01); *G06T 7/11* (2017.01);
(Continued)

(58) Field of Classification Search
None
See application file for complete search history.

(56) References Cited

U.S. PATENT DOCUMENTS

| 6,823,013 B1* | 11/2004 | Boice | H04N 19/43 375/240.17 |
| 6,876,702 B1* | 4/2005 | Hui | H04N 19/51 375/240.16 |

(Continued)

FOREIGN PATENT DOCUMENTS

| JP | 05061975 A | 3/1993 |
| JP | 06078292 A | 3/1994 |

(Continued)

OTHER PUBLICATIONS

Chen et al, Image Super-Resolution via Multi-Resolution Image Sequence, Proceedings of the 2013 International Conference on Wavelet Analysis and Pattern Recognition, Tianjin, Jul. 14-17, 2013. (Year: 2013).*

(Continued)

*Primary Examiner* — Andrae S Allison
(74) *Attorney, Agent, or Firm* — Holtz, Holtz & Volek PC

(57) ABSTRACT

An image acquisition device includes: an image acquisition unit that acquires images of a subject in time series; a hierarchical motion-detection unit that can detect a motion vector between the images acquired by the image acquisition unit, by using images at two or more levels having different resolutions; a pixel-value-change detecting unit that divides the images acquired by the image acquisition unit into a plurality of partial regions and that detects a temporal change of the pixel value at a detection pixel set in each of the partial regions; and a hierarchical-motion-detection setting unit that sets a larger number of levels used in the hierarchical motion-detection unit, for any of the partial regions that includes the detection pixel at which the temporal change detected by the pixel-value-change detecting unit is larger.

12 Claims, 14 Drawing Sheets

(51) Int. Cl.
  *G06T 7/207*    (2017.01)
  *G06T 7/11*     (2017.01)
  *G06T 1/00*     (2006.01)
  *G06T 5/50*     (2006.01)
  *G06T 7/254*    (2017.01)

(52) U.S. Cl.
  CPC .............. *G06T 7/207* (2017.01); *G06T 7/254* (2017.01); *H04N 19/43* (2014.11); *G06T 2207/20016* (2013.01); *G06T 2207/20021* (2013.01); *G06T 2207/20224* (2013.01)

(56) References Cited

U.S. PATENT DOCUMENTS

| | | | | |
|---|---|---|---|---|
| 8,107,748 | B2* | 1/2012 | Miao | H04N 19/56 375/240.02 |
| 2001/0004385 | A1* | 6/2001 | Okumura | H04N 5/145 375/240.16 |
| 2009/0103621 | A1 | 4/2009 | Numata et al. | |
| 2010/0110302 | A1 | 5/2010 | Yokoyama | |
| 2011/0007196 | A1 | 1/2011 | Yamashita et al. | |
| 2013/0206964 | A1 | 8/2013 | Yamashita et al. | |

FOREIGN PATENT DOCUMENTS

| | | |
|---|---|---|
| JP | 06105300 A | 4/1994 |
| JP | 06205389 A | 7/1994 |
| JP | 07030899 A | 1/1995 |
| JP | 3580612 B2 | 10/2004 |
| JP | 2008301085 A | 12/2008 |
| JP | 2009104284 A | 5/2009 |
| JP | 2009296574 A | 12/2009 |
| JP | 2010114597 A | 5/2010 |
| JP | 2012257120 A | 12/2012 |
| WO | 2009133967 A2 | 11/2009 |

OTHER PUBLICATIONS

International Search Report (ISR) and Written Opinion dated Aug. 25, 2015 issued in International Application No. PCT/JP2015/064578.

* cited by examiner

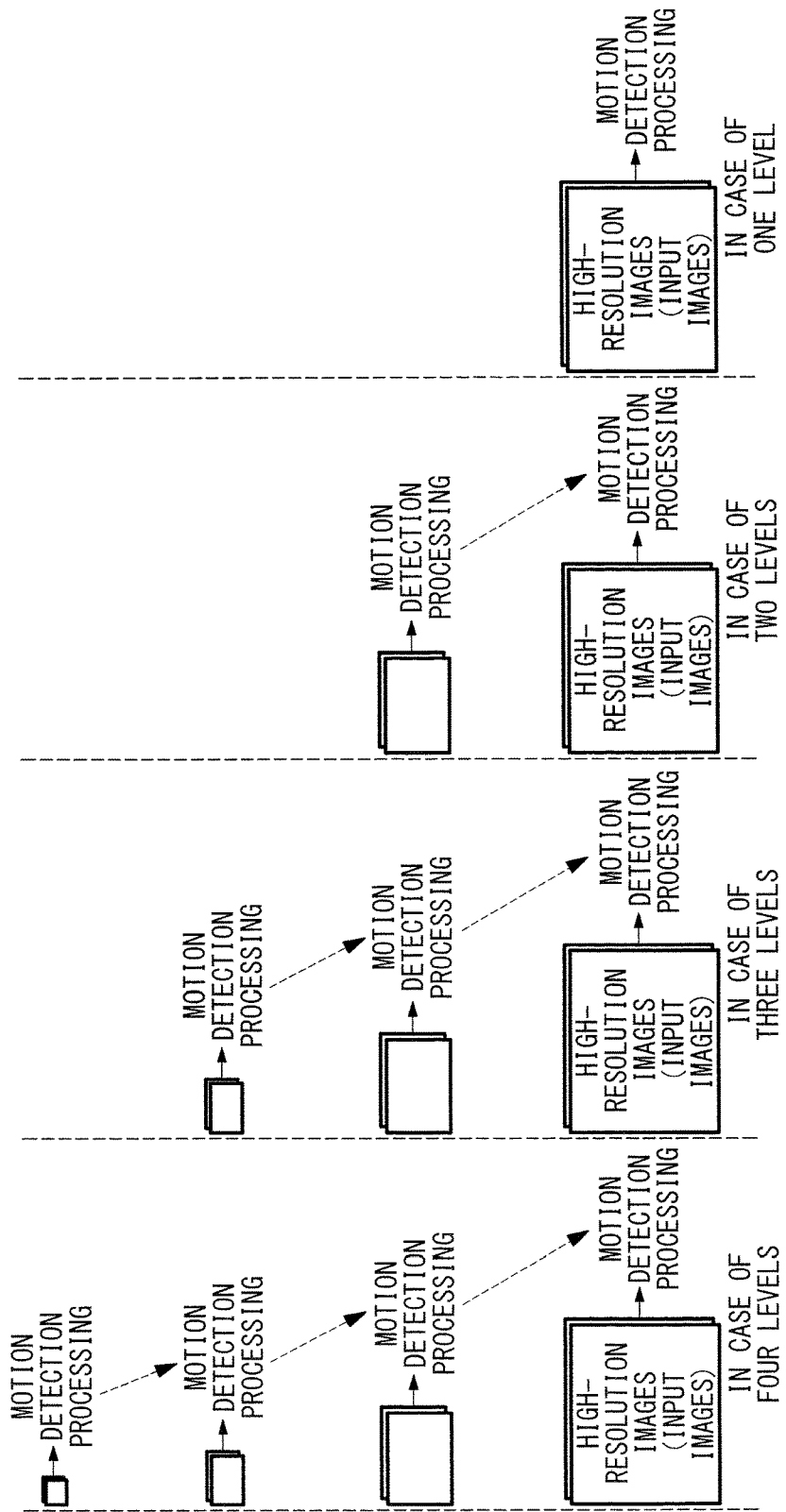

IMAGE ACQUISITION DEVICE, IMAGE PROCESSING DEVICE, IMAGE PROCESSING METHOD, IMAGE PROCESSING PROGRAM, AND STORAGE MEDIUM FOR GENERATING HIGH RESOLUTION IMAGE FROM LOW RESOLUTION IMAGES

CROSS-REFERENCE TO RELATED APPLICATIONS

This application is based on International Application PCT/JP2015/064578, the contents of which are incorporated herein by reference.

TECHNICAL FIELD

The present invention relates to an image acquisition device, an image processing device, an image processing method, an image processing program, and a storage medium.

BACKGROUND ART

There are known image processing methods in which motion is detected between images converted so as to have a low-resolution, and then while handing over the motion detection result thereof, high-accuracy motion detection is further performed in higher-resolution images (for example, see PTL 1).

CITATION LIST

Patent Literature

{PTL 1} Publication of Japanese Patent No. 3580612

SUMMARY OF INVENTION

According to one aspect, the present invention provides an image acquisition device including: an image acquisition unit that acquires images of a subject in time series; a hierarchical motion-detection unit that detects a motion vector between the images acquired by the image acquisition unit, by using images at two or more levels having different resolutions; a pixel-value-change detecting unit that divides the images acquired by the image acquisition unit into a plurality of partial regions and that detects a temporal change of the pixel value at a detection pixel set in each of the partial regions; and a hierarchical-motion-detection setting unit that sets a larger number of levels to be used in the hierarchical motion-detection unit, for any of the partial regions that includes the detection pixel at which the temporal change detected by the pixel-value-change detecting unit is larger.

Furthermore, according to another aspect, the present invention provides an image processing device including: a hierarchical motion-detection circuit that detects a motion vector between images acquired in time series, by using images at two or more levels having different resolutions; a memory circuit that stores an image acquired one frame before; an arithmetic circuit that calculates the difference between the one-frame-previous image stored in the memory circuit and the current image; and a hierarchical motion-detection setting circuit that sets a larger number of levels used in the hierarchical motion-detection circuit, for a partial region that includes a detection pixel at which the difference calculated by the arithmetic circuit is larger.

Furthermore, according to still another aspect, the present invention provides an image processing method including: a calculation step of calculating the difference between two images acquired in time series; a number-of-levels setting step of setting a larger number of levels for a partial region that includes a detection pixel at which the difference is larger, on the basis of the difference calculated in the calculation step; and a hierarchical motion-detection step of detecting, for each partial region, a motion vector between the two images by using the number of levels set in the number-of-levels setting step.

Furthermore, according to still another aspect, the present invention provides an image processing program for causing a computer to execute: a calculation step of calculating the difference between two images acquired in time series; a number-of-levels setting step of setting a larger number of levels for a partial region that includes a detection pixel at which the difference is larger, on the basis of the difference calculated in the calculation step; and a hierarchical motion-detection step of detecting, for each partial region, a motion vector between the two images by using the number of levels set in the number-of-levels setting step.

Furthermore, according to still another aspect, the present invention provides a non-transitory computer-readable storage medium having recorded an image processing program for causing a computer to execute: a calculation step of calculating the difference between two images acquired in time series; a number-of-levels setting step of setting a larger number of levels for a partial region that includes a detection pixel at which the difference is larger, on the basis of the difference calculated in the calculation step; and a hierarchical motion-detection step of detecting, for each partial region, a motion vector between the two images by using the number of levels set in the number-of-levels setting step.

BRIEF DESCRIPTION OF DRAWINGS

FIG. 4 is a view showing, in outline, hierarchical motion-detection processing performed by the image acquisition device shown in FIG. 1.

DESCRIPTION OF EMBODIMENT

An image acquisition device 1 according to one embodiment of the present invention will be described below with reference to the drawings.

Figure 1:
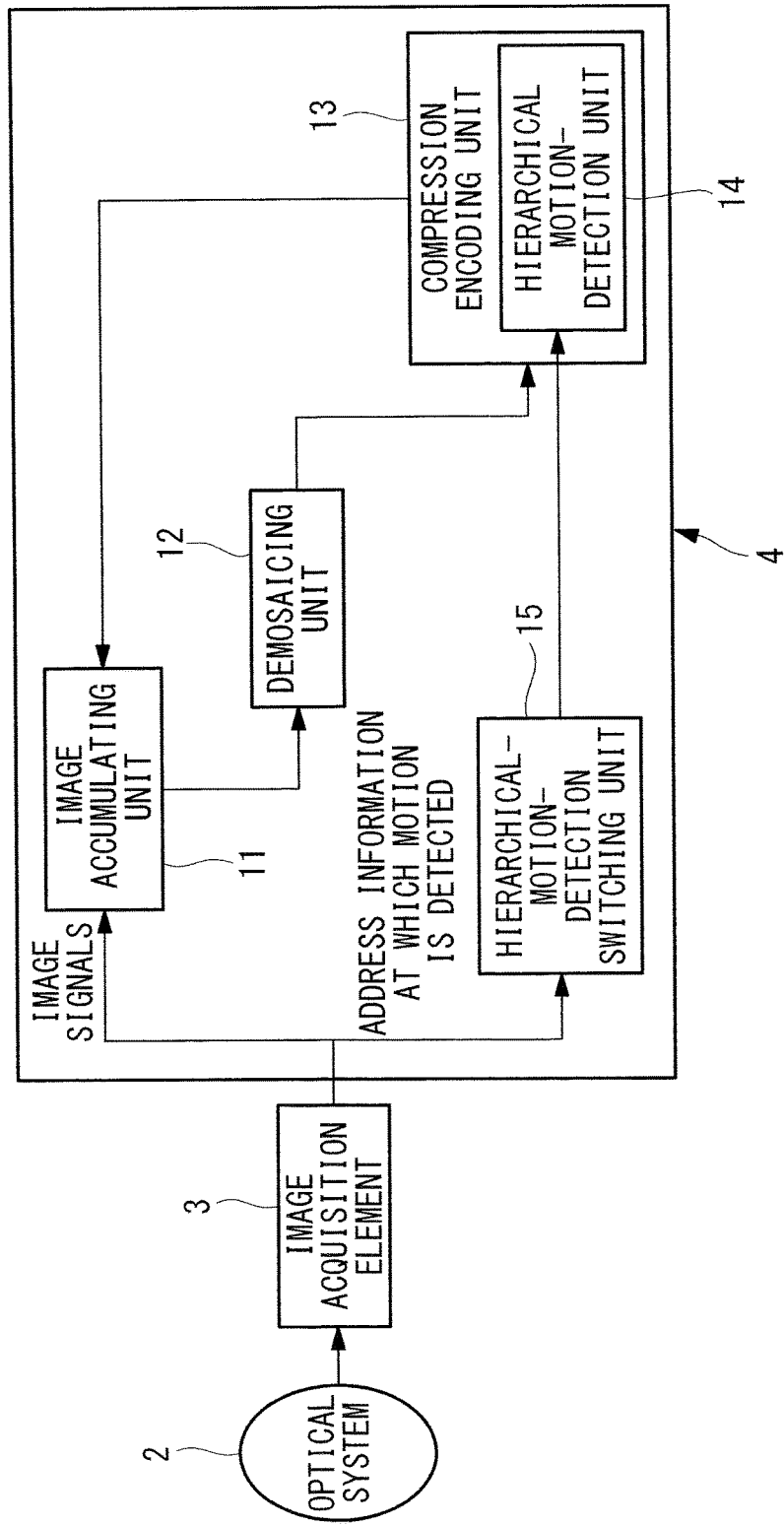
FIG. 1 is a schematic view showing an image acquisition device according to one embodiment of the present invention.

As shown in FIG. 1, the image acquisition device 1 of this embodiment is provided with: an optical system 2 that collects light from a subject; an image acquisition element 3 that captures the light collected by the optical system 2 to acquire an image; and an image processing device 4 that processes the image acquired by the image acquisition element 3.

Figure 2:
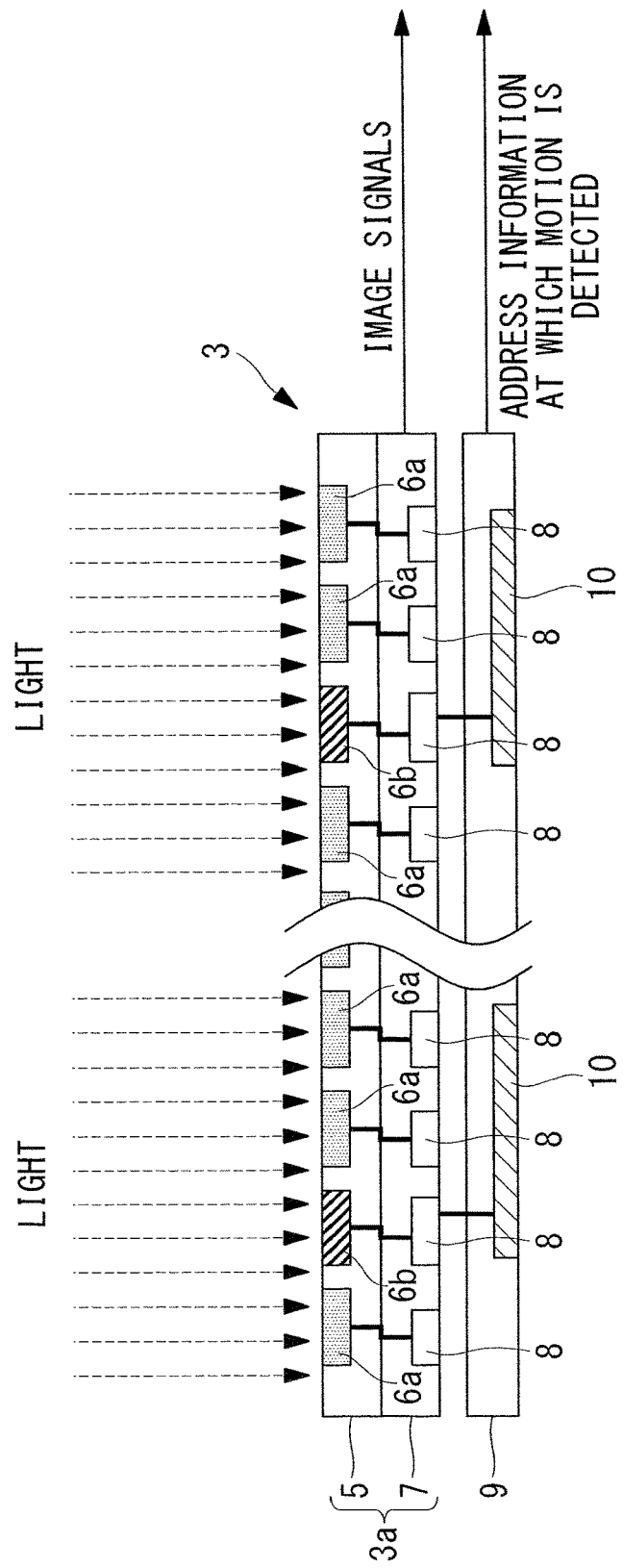
FIG. 2 is a view schematically showing the structure of an image acquisition element provided in the image acquisition device shown in FIG. 1.

As shown in FIG. 2, the image acquisition element 3 has a three-layer structure.

A first layer 5 on the surface is a PD layer in which photoelectric conversion elements 6a and 6b are two-dimensionally arrayed. The respective photoelectric conversion elements 6a and 6b receive light beams from the subject and output current signals having magnitudes corresponding to the intensities of the light beams.

A second layer 7 located under the first layer 5 is an RO layer that is provided with readout circuits 8. The RO layer converts the current signals from the photoelectric conversion elements 6a and 6b in the PD layer into voltage signals and outputs image signals in which the voltage signals and the addresses of pixels corresponding to the photoelectric conversion elements 6a and 6b are associated with each other. The first layer 5 and the second layer 7 constitute an image acquisition unit 3a.

A third layer 9 located under the second layer 7 is provided with motion detection circuits (pixel-value-change detecting units) 10 that detect the temporal changes of pixel values read out by particular readout circuits 8.

Figure 3:
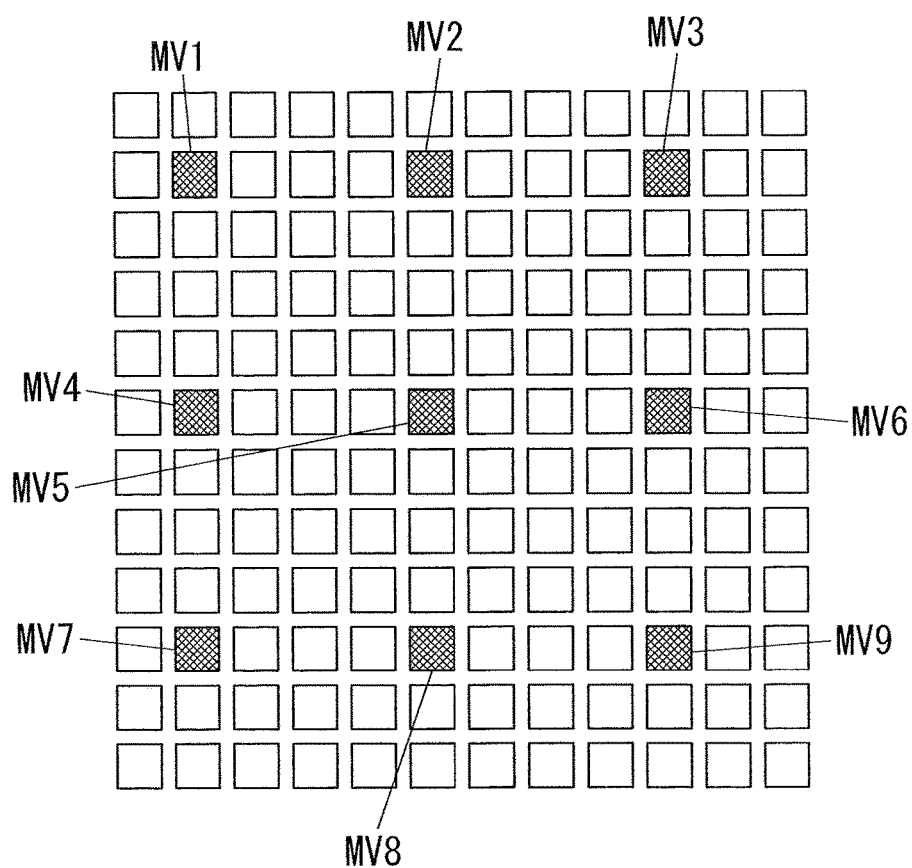
FIG. 3 is a view for explaining the array of detection pixels in the image acquisition element shown in FIG. 2.

The respective photoelectric conversion elements 6a and 6b form pixels, and, as shown in FIG. 3, among those pixels, a plurality of pixels that are located at predetermined intervals function as detection pixels MV1 to MV9. In the example shown in FIG. 3, the photoelectric conversion elements 6a and 6b are arrayed in vertical and horizontal directions, and the detection pixels MV1 to MV9 are disposed every four pixels in the vertical direction and in the horizontal direction, for ease of explanation. In this embodiment, as shown in FIG. 5C, 16 pixels in four rows and in four columns, which include the respective photoelectric conversion elements 6a and 6b, are defined as each of partial regions Q1 to Q9.

The motion detection circuits 10 convert voltage signals output from the respective detection pixels MV1 to MV9 into differential information by means of differentiators, produce pulse trains when the voltage signals change with an increasing tendency or a decreasing tendency indicated by the differential information, and output the numbers of pulses, per unit time, that have amplitude values equal to or greater than a predetermined threshold, together with the addresses of the corresponding detection pixels MV1 to MV9. Specifically, in this embodiment, the image acquisition element 3 outputs: the image signals of the subject; and the numbers of pulses and the addresses at the plurality of detection pixels MV1 to MV9, which are disposed every four pixels.

The image processing device 4 is provided with: an image accumulating unit 11 that accumulates image signals of the subject that are output from the image acquisition element 3; a demosaicing unit 12 that applies demosaicing processing to the image signals accumulated in the image accumulating unit 11; a compression encoding unit 13 that applies compression encoding processing to the image signals to which the demosaicing processing has been applied; and a hierarchical-motion-detection switching unit (hierarchical-motion-detection setting unit) 15 that sets the number of levels used in a hierarchical motion-detection unit 14, to be described later, on the basis of the numbers of pulses output from the image acquisition element 3.

In the demosaicing unit 12, in the case of input image signals in a Bayer array, the input image signals are subjected to pixel interpolation and are colorized.

The compression encoding unit 13 is provided with the hierarchical motion-detection unit 14.

As shown in FIG. 4, the hierarchical motion-detection unit 14 performs reduction processing on the input image signals by an amount corresponding to the number of stages corresponding to the number of levels sent from the hierarchical-motion-detection switching unit 15, starts motion detection processing in lowest-resolution images, and hands over the motion detection results so as to sequentially performs the motion detection processing in higher-resolution images. FIG. 4 shows example cases in which the numbers of levels are set to 1 to 4. For example, in the case in which the number of levels is set to 4, the motion detection processing is started in lowest-resolution images that are obtained by subjecting high-resolution original images input from the demosaicing unit 12 to three-stage reduction processing, and the motion detection processing is performed while propagating motion vectors, which are the motion detection results, to two-stage-reduced images, one-stage-reduced images, and the original images. The same applies to the cases in which the numbers of levels are set to 3 to 1.

The hierarchical-motion-detection switching unit 15 switches the numbers of levels in the motion detection processing, which is performed by the hierarchical motion-detection unit 14, for the partial regions Q1 to Q9, which include the detection pixels MV1 to MV9, depending on whether the temporal changes of the pixel values at the detection pixels MV1 to MV9 are greater than predetermined thresholds.

Figure 5A:
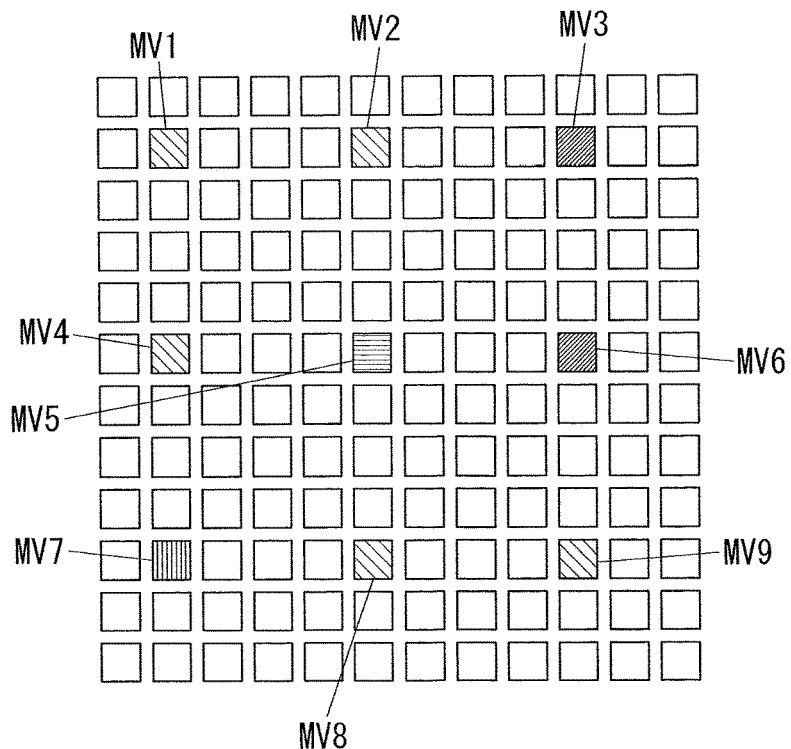
FIG. 5A is a view showing an example distribution of temporal change amounts of the pixel values at the detection pixels in the image acquisition element shown in FIG. 2.
Figure 5B:
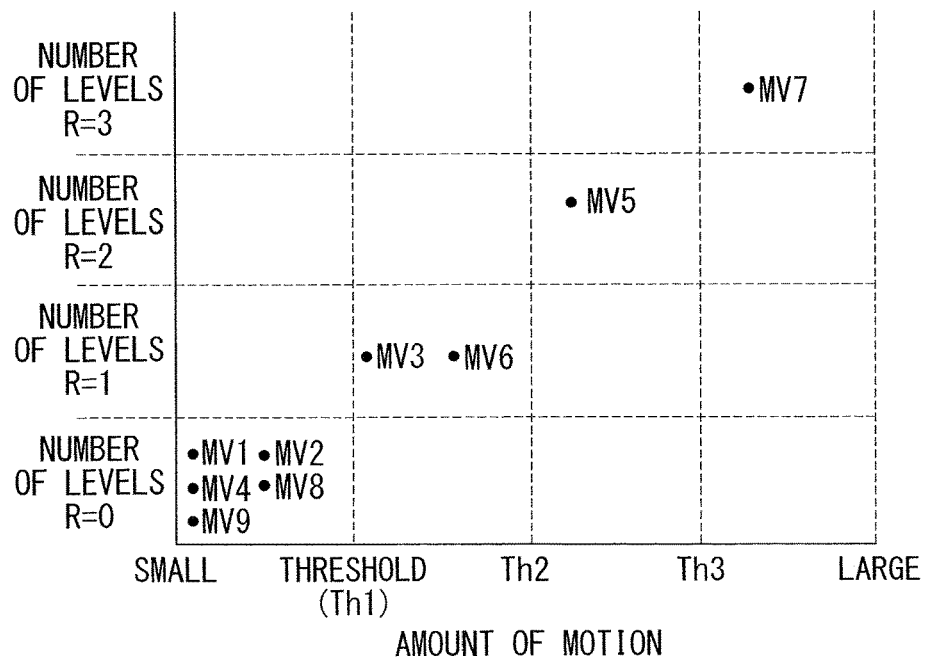
FIG. 5B is a view showing the relationship between the temporal change amounts of the pixel values at the detection pixels shown in FIG. 5A and settings for motion detection.
Figure 5C:
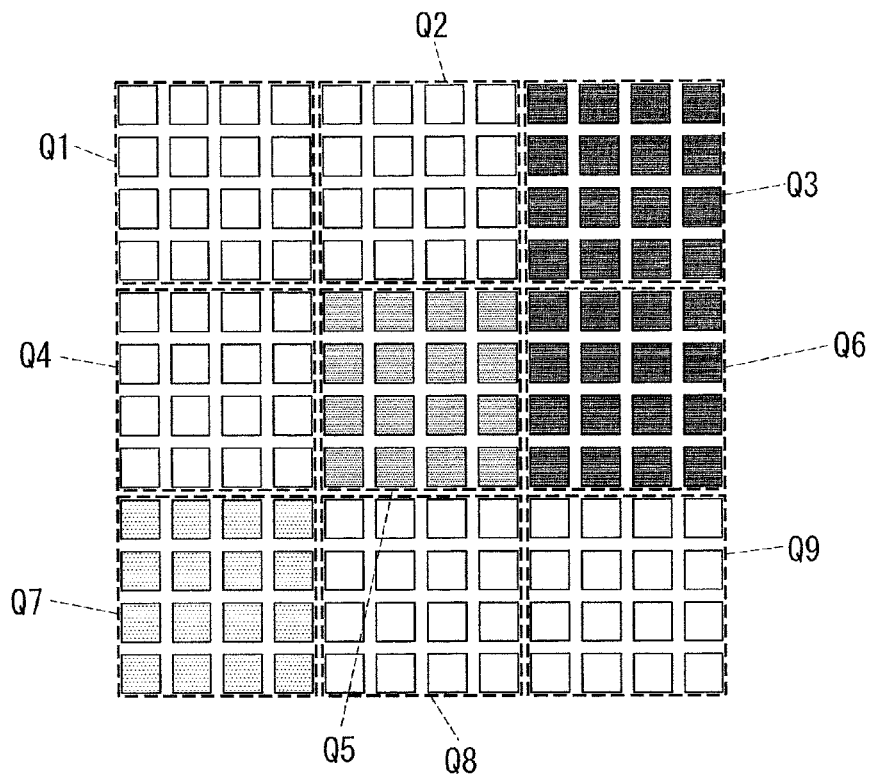
FIG. 5C is a view showing the differences in motion detection between partial regions, based on FIG. 5B.

For example, as shown in FIG. 5A, among 12×12 pixels, the nine detection pixels MV1 to MV9, which are disposed every four pixels, are classified according to the magnitudes of the temporal changes of the pixel values output from the image acquisition element 3, as shown in FIG. 5B.

Specifically, the hierarchical-motion-detection switching unit 15 switches the numbers of levels, as shown in FIG. 5A:

when the temporal changes of the pixel values at the detection pixels MV1, MV2, MV4, MV8, and MV9 are equal to or less than a threshold Th1;

those at the detection pixels MV3 and MV6 are greater than the threshold Th1 and equal to or less than a threshold Th2;

that at the detection pixel MV5 is greater than the threshold Th2 and equal to or less than a threshold Th3; and that at the detection pixel MV7 is greater than the threshold Th3.

Accordingly, as shown in FIGS. 5A and 5C, the number of levels R is set to 0 for the partial regions Q1, Q2, Q4, Q8, and Q9, which include the detection pixel MV1, MV2, MV4, MV8, and MV9, the number of levels R is set to 1 for the partial regions Q3 and Q6, which include the detection pixels MV3 and MV6, the number of levels R is set to 2 for the partial region Q5, which includes the detection pixel MV5, and the number of levels R is set to 3 for the partial region Q7, which includes the detection pixel MV7.

The partial regions Q1, Q2, Q4, Q8, and Q9, for which the number of levels R is set to 0, are treated as still regions where there is no motion vector, and the motion detection processing is not ever performed therefor. For the partial regions Q3 and Q6, for which the number of levels R is set to 1, the motion detection processing is performed by using only the highest-resolution original images. Furthermore, for the partial region Q5, for which the number of levels R is set to 2, the motion detection processing is performed by using the highest-resolution original images and the one-stage-reduced low-resolution images. Furthermore, for the partial region Q7, for which the number of levels R is set to 3, the motion detection processing is performed by using the highest-resolution original images, the one-stage-reduced images, and the two-stage-reduced images.

The operation of the thus-configured image acquisition device 1 of this embodiment will be described below.

When a subject is captured by using the image acquisition device 1 of this embodiment, the image acquisition unit 3a obtains image signals, and the plurality of detection pixels MV1 to MV9, which are arrayed at intervals, obtain temporal changes of the pixel values at the positions corresponding to the detection pixels MV1 to MV9, together with the addresses of the detection pixels MV1 to MV9.

The image signals obtained by the image acquisition unit 3a are accumulated in the image accumulating unit 11 in the image processing device 4, are then sent to the demosaicing unit 12, and are subjected to demosaicing processing. The image signals that have been subjected to the demosaicing processing are sent to the compression encoding unit 13 and are subjected to compression encoding processing.

In the compression encoding processing in the compression encoding unit 13, the motion detection processing is performed in the hierarchical motion-detection unit 14, and motion vectors in the images are obtained.

In this case, according to the image acquisition device 1 of this embodiment, the motion detection processing performed in the hierarchical motion-detection unit 14 is switched by the hierarchical-motion-detection switching unit 15 according to the magnitudes of the temporal changes of the pixel values at the detection pixels MV1 to MV9, which are output from the image acquisition unit 3a.

Specifically, for the partial regions Q1, Q2, Q4, Q8, and Q9, which include the detection pixels MV1, MV2, MV4, MV8, and MV9, at which the temporal changes of the pixel values at the detection pixels MV1 to MV9 are equal to or less than the predetermined threshold Th1, the number of levels R is set to 0 in the hierarchical-motion-detection switching unit 15, and the motion detection processing is not performed in the hierarchical motion-detection unit 14. Accordingly, the processing time required for the motion detection processing can be significantly reduced.

Furthermore, for the partial regions Q3, Q5, Q6, and Q7, which include the detection pixels MV3, MV5, MV6, and MV7 at which the temporal changes of the pixel values at the detection pixels MV1 to MV9 are greater than the threshold Th1, the number of levels R is switched among 1, 2, and 3 according to the magnitudes of the temporal changes.

By doing so, compared with a conventional case in which motion detection processing is performed at the same high number of levels for pixels over all regions, it is possible to perform the motion detection processing at a smaller number of levels for the partial regions Q1, Q2, Q4, Q8, and Q9, in which the temporal changes are small; thus, there is an advantage in that the processing time required for the motion detection processing can be significantly reduced. Then, only for the partial regions Q3, Q5, Q6, and Q7, in which the temporal changes are large, the motion detection processing is performed at a larger number of levels; thus, there is an advantage in that motion vectors can be detected with high accuracy.

Note that, in this embodiment, although the number of levels in the motion detection processing is switched according to the magnitudes of the temporal changes of the pixel values at the detection pixels MV1 to MV9, in addition to this, the search range in the hierarchical motion-detection unit 14 may also be switched.

Figure 6A:
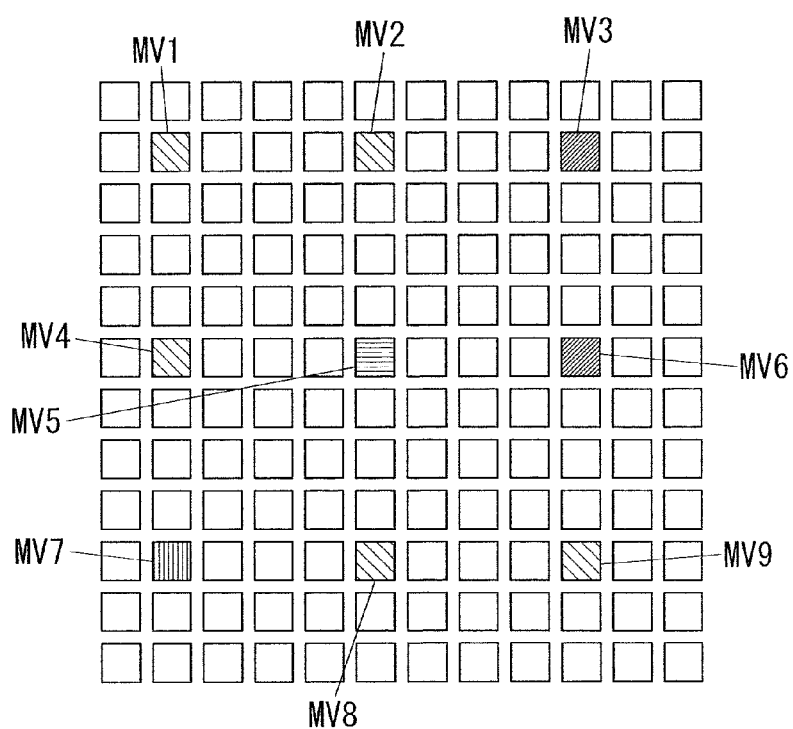
FIG. 6A is a view showing a modification of FIG. 5A.
Figure 6B:
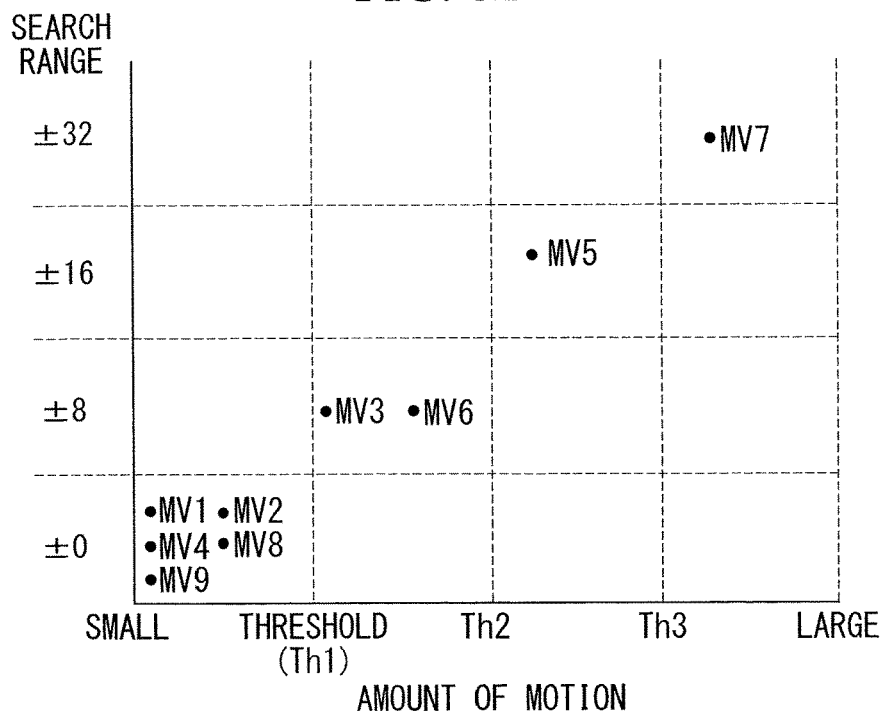
FIG. 6B is a view showing the relationship between the temporal change amounts of the pixel values at detection pixels shown in FIG. 6A and settings for motion detection.
Figure 6C:
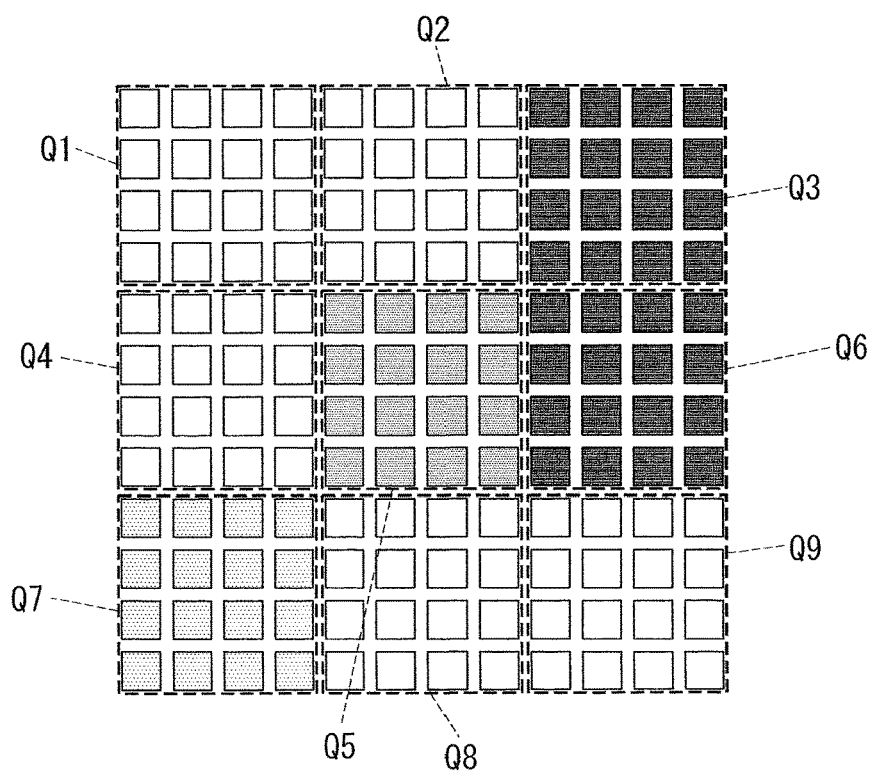
FIG. 6C is a view showing the differences in motion detection between partial regions, based on FIG. 6B.

Specifically, as shown in FIGS. 6A to 6C, the search ranges are classified by thresholds according to the magnitudes of the temporal changes of the pixel values at the detection pixels MV1 to MV9: ±0 pixel is set in the search ranges for the partial regions Q1, Q2, Q4, Q8, and Q9, which include the detection pixels MV1, MV2, MV4, MV8, and MV9; ±8 pixels are set in the search ranges for the partial regions Q3 and Q6, which include the detection pixels MV3 and MV6; ±16 pixels are set in the search range for the partial region Q5, which includes the detection pixel MV5; and ±32 pixels are set in the search range for the partial region Q7, which includes the detection pixel MV7.

In FIG. 6B, although the search ranges in the motion detection processing using the highest-resolution images are illustrated, in motion detection processing using lower-resolution images, corresponding search ranges are set in consideration of the reduction ratio.

Figure 7:
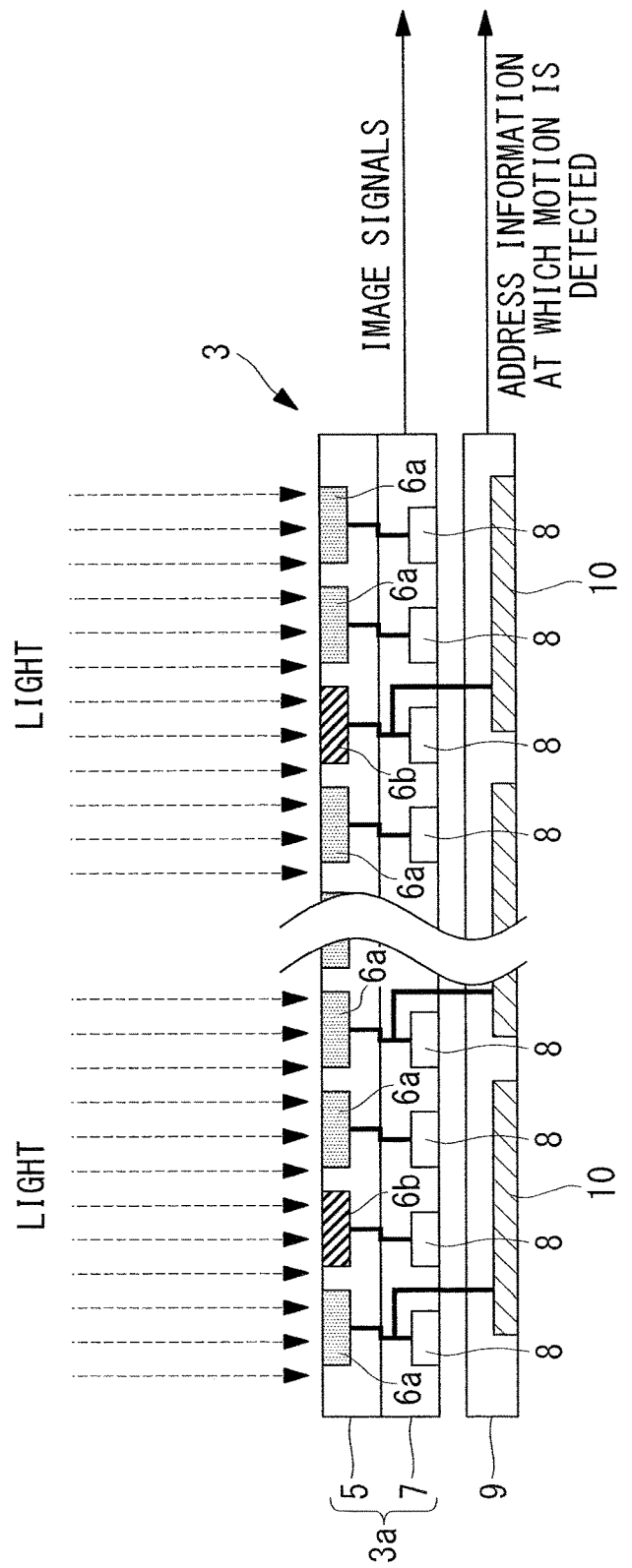
FIG. 7 is a view showing a modification of the image acquisition element shown in FIG. 2.

Furthermore, in this embodiment, although an example case in which the detection pixels are disposed separately from the pixels for outputting image signals has been illustrated, as shown in FIG. 7, the detection pixels may perform both functions.

Specifically, signals may be split off based on the same exposure or may be used for both purposes through time division. In the case of the time division, the obtained image signals are transferred to an image memory and held therein, so as to allow re-exposure.

Figure 8:
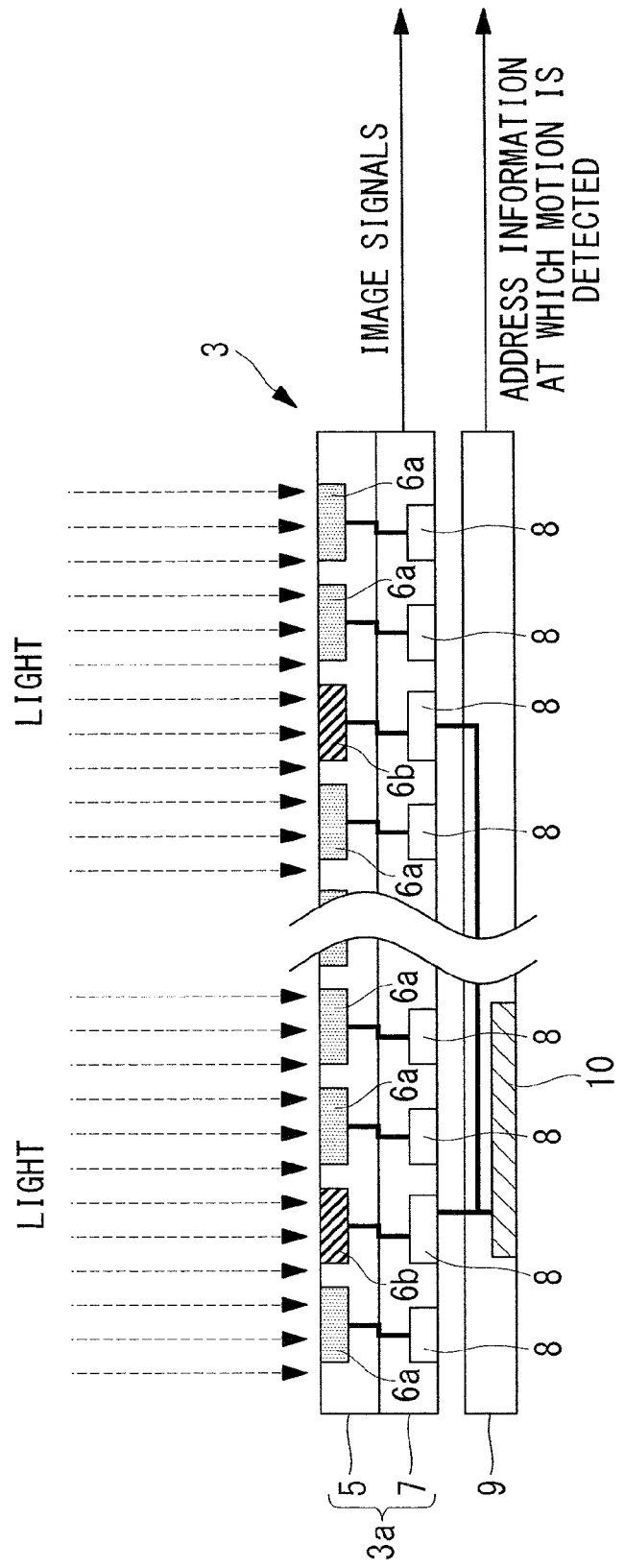
FIG. 8 is a view showing another modification of the image acquisition element shown in FIG. 2.

Furthermore, in order to reduce the signal-to-noise ratio in motion detection and the aliasing caused by under sampling, signals at the detection pixels may be arithmetically averaged. When the detection pixels are separated from each other, a phenomenon in which the sampling period is low with respect to the bandwidth of the aperture occurs, and, as a result, aliasing, in which a motion having a high-frequency pattern is detected as a motion having a low-frequency pattern, occurs. In order to prevent this, as shown in FIG. 8, signals at adjacent detection pixels may be integrated and arithmetically averaged and then may be sent to the hierarchical-motion-detection switching unit 15.

Figure 9:
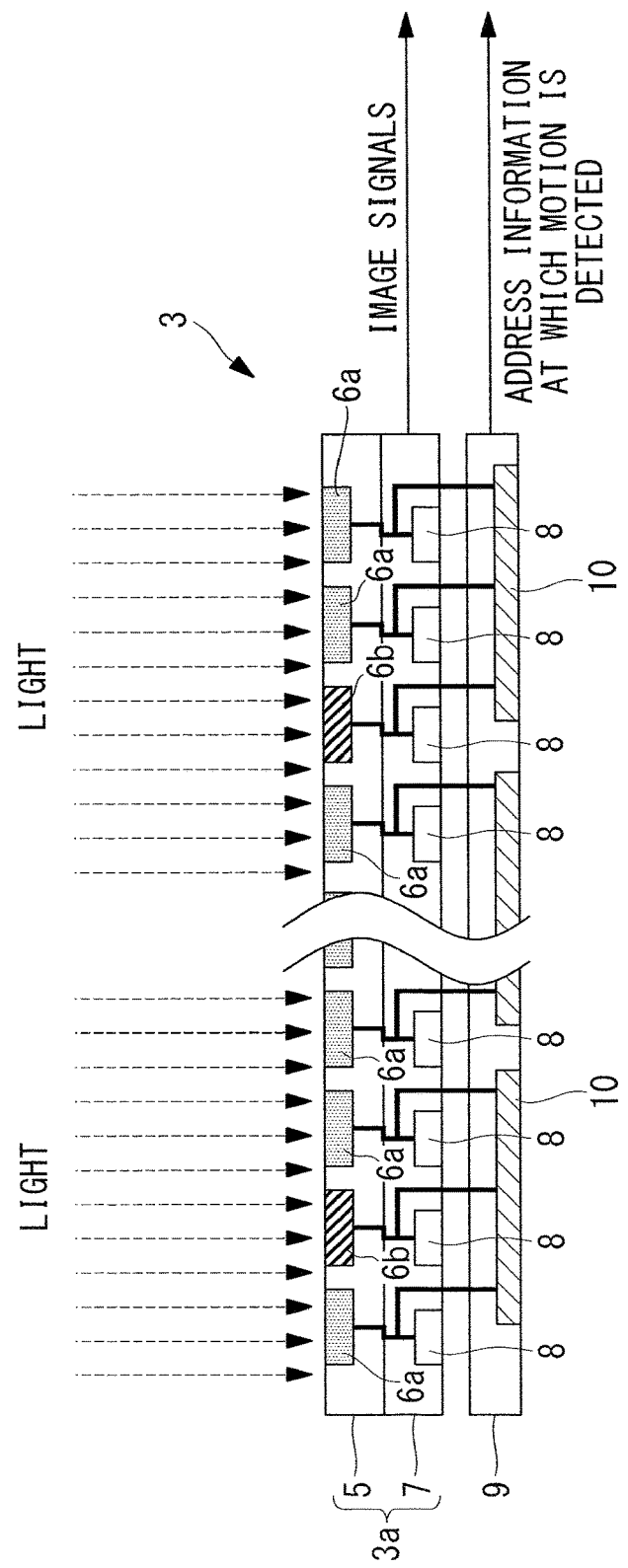
FIG. 9 is a view showing still another modification of the image acquisition element shown in FIG. 2.

Furthermore, when the detection pixels also serve to obtain image signals, as shown in FIG. 9, signals at a plurality of adjacent pixels may be integrated and arithmetically averaged and then may be sent to the hierarchical-motion-detection switching unit 15.

Furthermore, when the PD layer has a color Bayer array, same-color (for example, G-channel) pixels may be arithmetically averaged for each partial region, and the motion detection processing may be switched according to the result.

Figure 10:
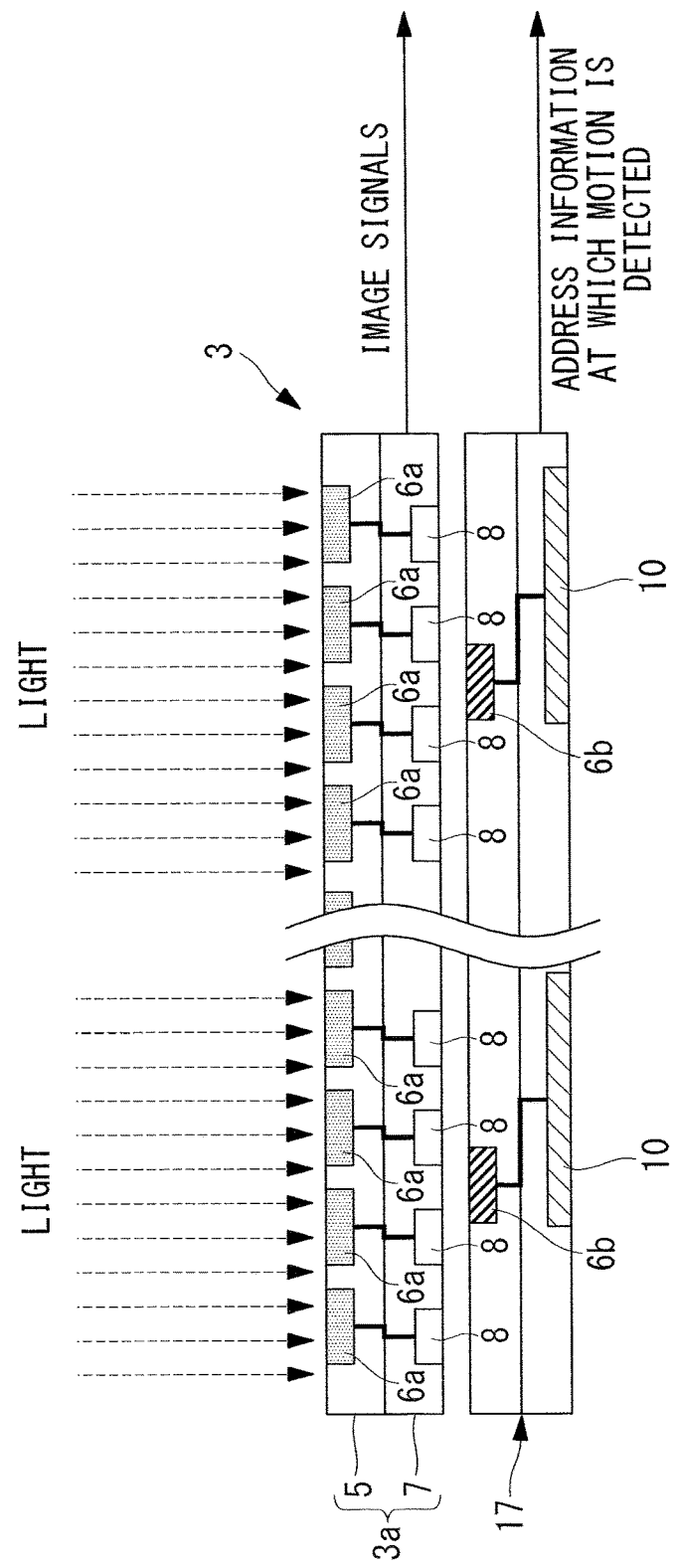
FIG. 10 is a view showing still another modification of the image acquisition element shown in FIG. 2.

Furthermore, as shown in FIG. 10, it is also possible to adopt an image acquisition element 3 that is provided with a third layer 17 in which photoelectric conversion elements 6b that are detection pixels are arrayed, separately from a first layer 5 in which photoelectric conversion elements 6a that are used to obtain image signals are arrayed. It is known that, if a silicon substrate is thin, long-wavelength light is transmitted therethrough; thus, by using this, part of the light transmitted through the first layer 5 and the second layer 7 can be made to reach the third layer 17, Accordingly, image signals from all pixels in the first layer 5 can be used for image formation.

Figure 11:
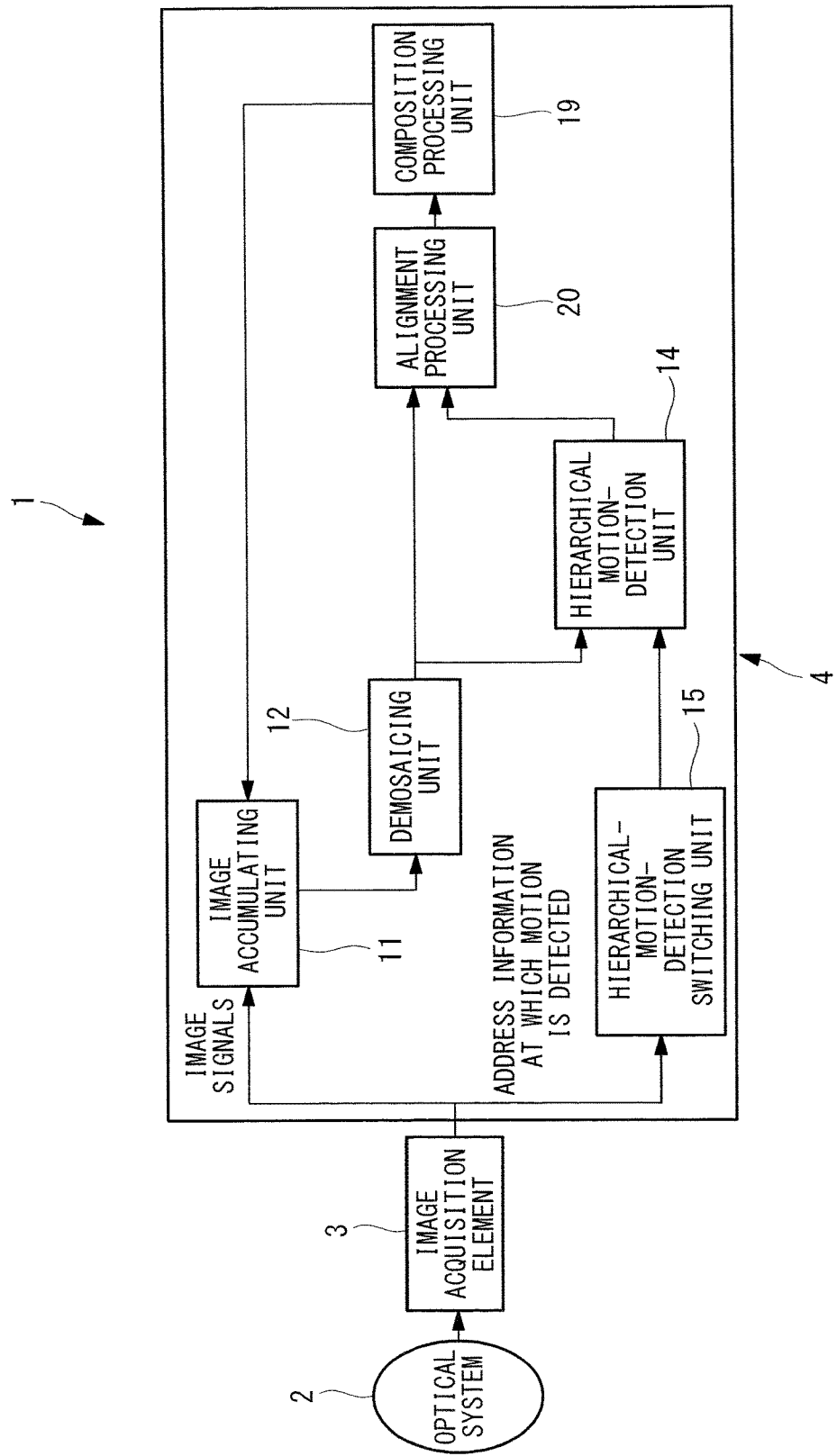
FIG. 11 is a schematic view showing a modification of the image acquisition device shown in FIG. 1.

Furthermore, in this embodiment, although a description has been given of the hierarchical motion-detection processing performed in the compression encoding unit 13, instead of this, as shown in FIG. 11, the motion detection processing may be performed in the hierarchical motion-detection unit 14 for alignment processing between images performed by an alignment processing unit 20, prior to image compositing processing between frames performed by a compositing processing unit 19.

Figure 12:
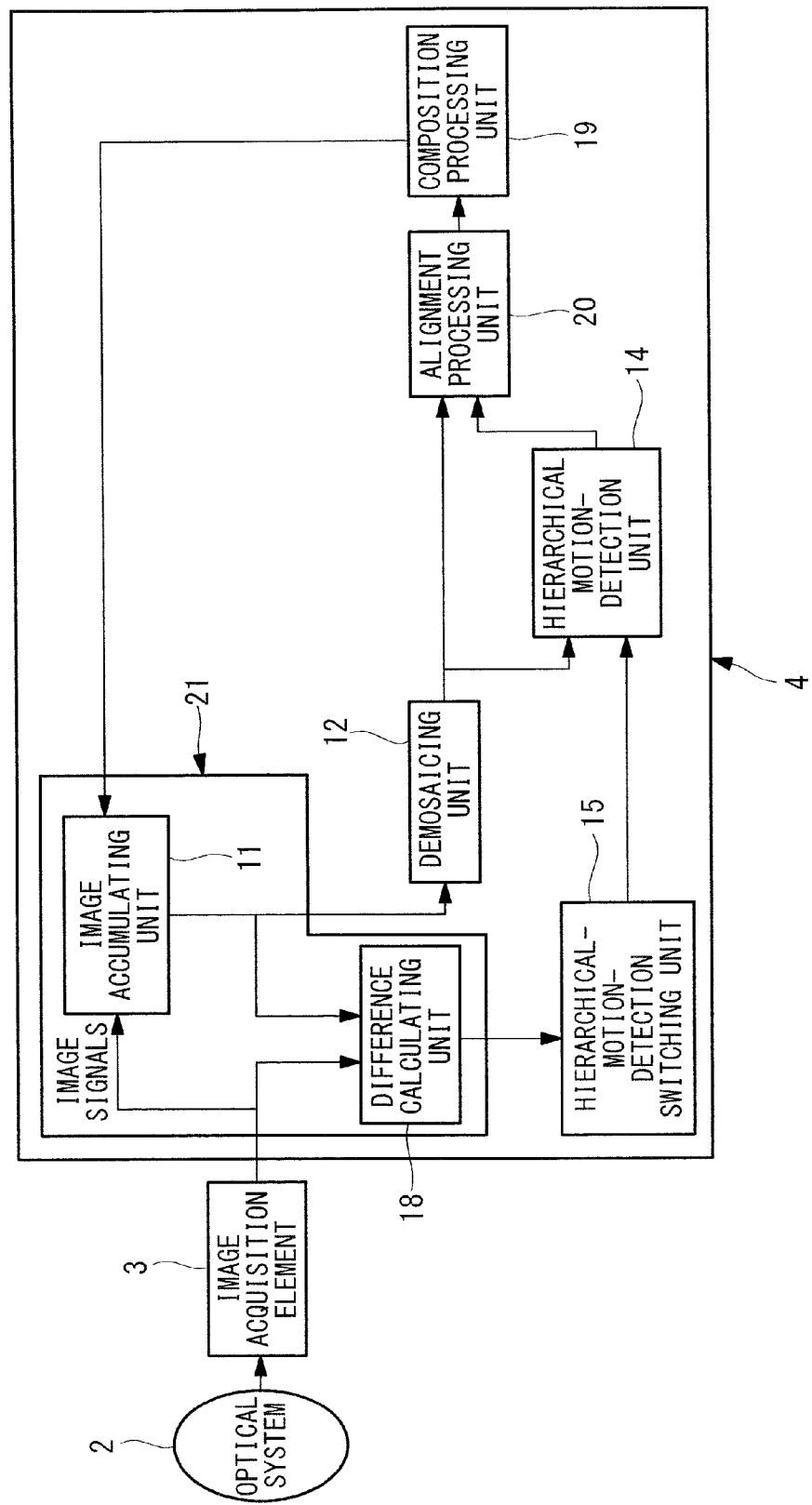
FIG. 12 is a schematic view showing another modification of the image acquisition device shown in FIG. 1.

Furthermore, in this embodiment, although the temporal changes of the pixel values at the detection pixels are directly output from the image acquisition unit 3a, instead of this, as shown in FIG. 12, a difference calculating unit 18 that calculates the difference between two images acquired in time series may be provided, and the hierarchical-motion-detection switching unit 15 may switch, for each partial region, the number of levels in the motion detection processing, on the basis of the magnitude of the difference value, the difference value at a particular detection pixel output from the difference calculating unit 18 serving as the temporal change of the pixel value.

By doing so, without using, as the image acquisition unit 3a, a special means for outputting the temporal change of the pixel value at a detection pixel, the temporal change of the pixel value at a detection pixel can be obtained in image processing performed at the subsequent stage.

Specifically, the present invention can be conceptualized as an image processing device 4 that is provided with: a pixel-value-change detecting unit 21 that includes an image accumulating unit (memory circuit) 11 that stores images acquired in time series, and the difference calculating unit (arithmetic circuit) 18, which calculates the difference value between the images acquired in time series; a hierarchical-motion-detection switching unit (hierarchical motion-detection setting circuit) 15 that switches the number of levels so as to increase the number of levels as the difference value becomes larger; and a hierarchical motion-detection unit (hierarchical motion-detection circuit) 14 that performs, for each partial region, motion detection processing at the switched number of levels.

Figure 13:
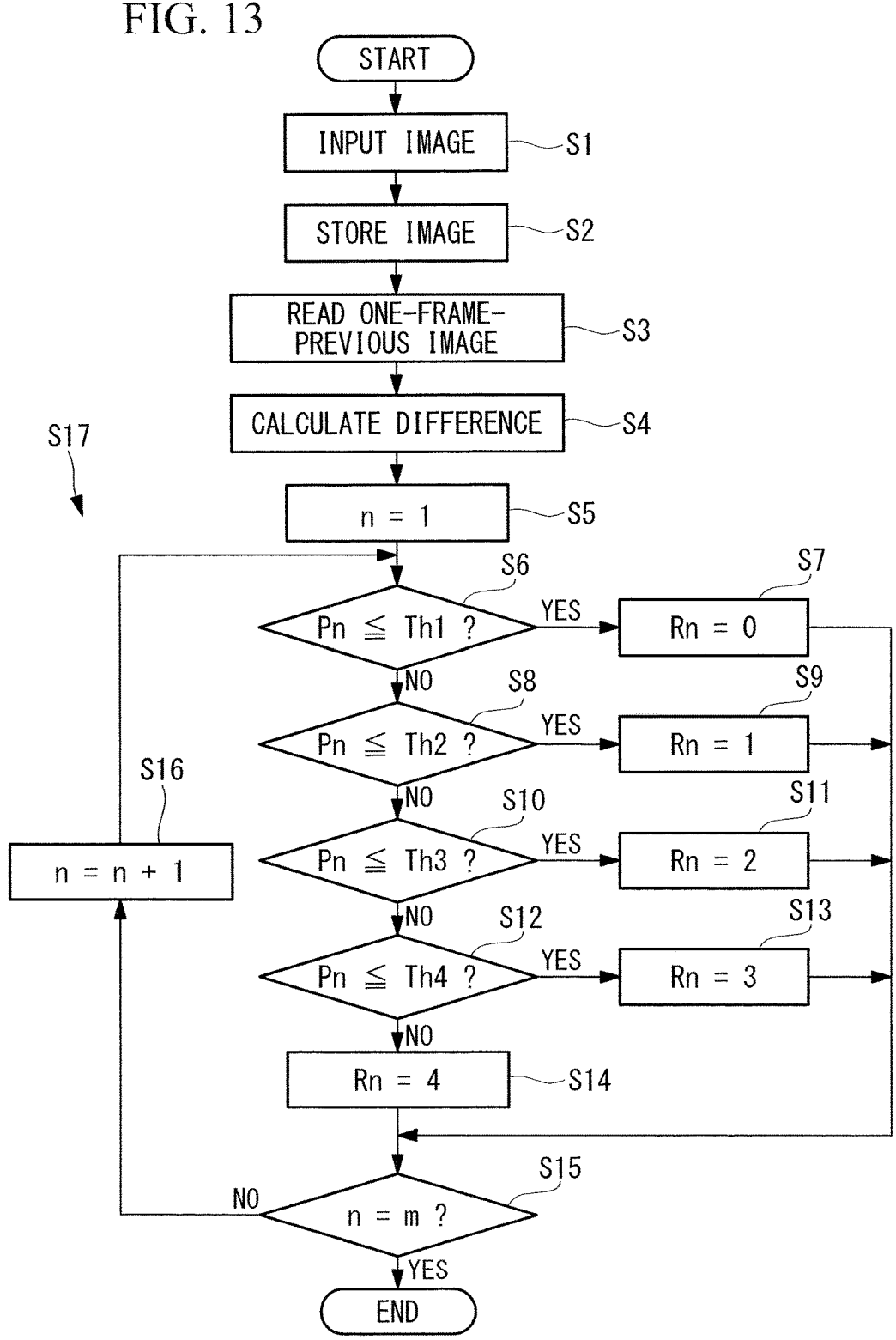
FIG. 13 is a flowchart for explaining an image processing method performed by an image processing device provided in an image acquisition device shown in FIG. 12.

Then, as shown in FIG. 13, an image processing method using the thus-configured image processing device 4 includes: an image inputting step S1 of inputting image signals from the image acquisition element 3; an image storing step S2 of storing, in the image accumulating unit 11, the image signals input in the image inputting step S1; an image reading step S3 of reading a one-frame-previous image that has already been stored in the image accumulating unit 11; and a difference calculating step (calculation step) S4 of calculating, in the difference calculating unit 18, the difference between the input current-frame image and the read one-frame-previous image.

Furthermore, when the difference is calculated, n is reset to 1 (Step S5), and difference values Pn, from n=1 to n=m, corresponding to m detection pixels are compared with each of thresholds Th1 to Th4 (Steps S6 to S12). First, it is determined whether the difference value Pn is equal to or less than the threshold Th1 (Step S6). If the difference value Pn is equal to or less than the threshold Th1, the number of levels Rn for the n-th detection pixel is set to 0 (number-of-levels setting step S7), and it is determined whether n is equal to m (Step S15).

If the difference value Pn is not equal to or less than the threshold Th1, it is determined whether the difference value Pn is equal to or less than the threshold Th2 (Step S8). If the difference value Pn is equal to or less than the threshold Th2, the number of levels Rn for the n-th detection pixel is set to 1 (number-of-levels setting step S9), and it is determined whether n is equal to m (Step S15).

If the difference value Pn is not equal to or less than the threshold Th2, it is determined whether the difference value Pn is equal to or less than the threshold Th3 (Step S10). If the difference value Pn is equal to or less than the threshold Th3, the number of levels Rn for the n-th detection pixel is set to 2 (number-of-levels setting step S11), and it is determined whether n is equal to m (Step S15).

If the difference value Pn is not equal to or less than the threshold Th3, it is determined whether the difference value Pn is equal to or less than the threshold Th4 (Step S12). If the difference value Pn is equal to or less than the threshold Th4, the number of levels Rn for the n-th detection pixel is set to 3 (number-of-levels setting step S13), and it is determined whether n is equal to m (Step S15).

If the difference value Pn is not equal to or less than the threshold Th4, the number of levels Rn for the n-th detection pixel is set to 4 (number-of-levels setting step S14), and it is determined whether n is equal to m (Step S15).

If n is not equal to m, n is incremented (Step S16), and the process from Step S6 is repeated (hierarchical motion-detection step S17). If n is equal to m, the processing ends.

In this way, according to the image processing device 4 and the image processing method of this embodiment, because the number of levels in the hierarchical motion-detection processing is switched for each partial region according to the difference value between images acquired in time series, to detect motion vectors between the images, there is an advantage in that it is possible to reduce the processing time and to perform high-accuracy motion detection, compared with a conventional case in which motion detection processing is performed at the same number of levels for all regions.

Note that the image processing method of this embodiment can be performed not only by the image processing device 4, which is composed of circuits, as described above, but also by an image processing program that can be executed by a computer. In this case, a processor, such as a CPU, executes the image processing program, thereby performing the image processing method of this embodiment.

Specifically, the image processing program stored in a storage medium is read out, and the read out image processing program is executed by the processor, such as a CPU. Here, the storage medium stores programs, data, etc., and the function thereof can be realized by an optical disk (DVD, CD, etc.), a hard disk drive, or a memory (card-type memory, ROM, etc.).

From the above-described embodiments and modifications thereof, the following aspects of the invention are derived.

According to one aspect, the present invention provides an image acquisition device including: an image acquisition unit that acquires images of a subject in time series; a hierarchical motion-detection unit that detects a motion vector between the images acquired by the image acquisition unit, by using images at two or more levels having different resolutions; a pixel-value-change detecting unit that divides the images acquired by the image acquisition unit into a plurality of partial regions and that detects a temporal change of the pixel value at a detection pixel set in each of the partial regions; and a hierarchical-motion-detection setting unit that sets a larger number of levels to be used in the hierarchical motion-detection unit, for any of the partial regions that includes the detection pixel at which the temporal change detected by the pixel-value-change detecting unit is larger.

According to this aspect, the pixel-value-change detecting unit detects the temporal change of the pixel value at a detection pixel, for each of a plurality of partial regions of images acquired in time series by the image acquisition unit, and, on the basis of the magnitude of the detected temporal change of the pixel value, the number of levels in motion detection processing is set for the partial region that includes the corresponding detection pixel. When the temporal change of the pixel value is small, for the partial region that includes the corresponding detection pixel, motion detection processing using images at a higher-resolution level is performed. When the temporal change of the pixel value is large, for the partial region that includes the corresponding detection pixel, the motion detection processing is repeated while hierarchically propagating the motion detection result from images at a lower-resolution level to images at a high-resolution level.

Specifically, for a partial region in which the temporal change of the pixel value at the detection pixel is small, the motion detection processing can be performed by using high-resolution images without preparing lower-resolution images, thus making it possible to reduce the processing time. On the other hand, for a partial region in which the temporal change of the pixel value at the detection pixel is large, the motion detection is hierarchically performed by handing over the motion detection processing from lower-resolution images, thus making it possible to perform high-accuracy motion detection.

In the above-described aspect, the image acquisition unit and the pixel-value-change detecting unit may be circuits provided in an image acquisition element.

By doing so, when an image acquisition circuit that is provided in the image acquisition element acquires images, a pixel-value-change detecting circuit that is also provided in the image acquisition element detects and outputs the temporal change of the pixel value at a detection pixel; thus, with an image processing circuit having a simple configuration, it is possible to reduce the processing time and to perform high-accuracy motion detection.

Furthermore, in the above-described aspect, the pixel-value-change detecting unit may be provided with: a memory circuit that stores a one-frame-previous image acquired by the image acquisition unit; and an arithmetic circuit that calculates, as the temporal change, the difference between the one-frame-previous image stored in the memory circuit and the current image.

By doing so, an image acquired by the image acquisition unit is stored in the memory circuit, and, when an image in the next frame is acquired by the image acquisition unit, the arithmetic circuit calculates the difference between the one-frame-previous image read out from the memory circuit and the current image, as the temporal change of the pixel value at the detection pixel. Without using a special image acquisition element, the temporal change of the pixel value can be obtained through calculation, thus making it possible to reduce the processing time and to perform high-accuracy motion detection.

Furthermore, in the above-described aspect, the hierarchical-motion-detection setting unit may prevent motion detection processing from being performed in the hierarchical motion-detection unit, for any of the partial regions that includes the detection pixel at which the temporal change detected by the pixel-value-change detecting unit is equal to or less than a predetermined threshold.

By doing so, when the temporal change of the pixel value at the detection pixel is equal to or less than the predetermined threshold, the hierarchical motion-detection unit does not perform motion detection processing for the partial region that includes the pixel value; thus, unnecessary motion detection processing for a region where the movement is small is prevented, thus making it possible to further reduce the processing time.

Furthermore, in the above-described aspect, the hierarchical-motion-detection setting unit may expand a search range for the motion detection processing, which is performed in the hierarchical motion-detection unit, as the magnitude of the temporal change detected by the pixel-value-change detecting unit becomes larger.

By doing so, because a narrower search range is used as the temporal change of the pixel value at the detection pixel becomes smaller, it is possible to reduce the processing time.

Furthermore, according to another aspect, the present invention provides an image processing device including: a hierarchical motion-detection circuit that detects a motion vector between images acquired in time series, by using images at two or more levels having different resolutions; a memory circuit that stores an image acquired one frame before; an arithmetic circuit that calculates the difference between the one-frame-previous image stored in the memory circuit and the current image; and a hierarchical motion-detection setting circuit that sets a larger number of levels used in the hierarchical motion-detection circuit, for a partial region that includes a detection pixel at which the difference calculated by the arithmetic circuit is larger.

According to this aspect, a one-frame-previous image that is acquired in time series is stored in the memory circuit, and, when the current image is acquired, the difference between the two images is calculated by the arithmetic circuit. Then, for a partial region that includes the detection pixel at which the calculated difference is larger, a larger number of levels for motion detection processing is set by the hierarchical motion-detection setting circuit. When the difference in the pixel value is small, for the partial region, which includes the detection pixel, the motion detection processing is performed by using images at a higher-resolution level. When the temporal change of the pixel value is large, for the partial region, which includes the detection pixel, the motion detection processing is repeated while hierarchically propagating the motion detection result from images at a lower-resolution level to images at a high-resolution level. Accordingly, it is possible to reduce the processing time and to perform high-accuracy motion detection.

In the above-described aspect, the hierarchical motion-detection setting circuit may prevent motion detection processing from being performed in the hierarchical motion-detection circuit, for the partial region, which includes the detection pixel at which the difference calculated by the arithmetic circuit is equal to or less than a predetermined threshold.

Furthermore, in the above-described aspect, the hierarchical motion-detection setting circuit may expand a search range for motion detection processing performed in the hierarchical motion-detection circuit, as the magnitude of the temporal change detected by the pixel-value-change detecting unit becomes larger.

Furthermore, according to still another aspect, the present invention provides an image processing method including: a calculation step of calculating the difference between two images acquired in time series; a number-of-levels setting step of setting a larger number of levels for a partial region that includes a detection pixel at which the difference is larger, on the basis of the difference calculated in the calculation step; and a hierarchical motion-detection step of detecting, for each partial region, a motion vector between the two images by using the number of levels set in the number-of-levels setting step.

In the above-described aspect, in the hierarchical motion-detection step, a motion vector may be detected after excluding the partial region, which includes the detection pixel at which the difference calculated in the calculation step is equal to or less than a predetermined threshold.

Furthermore, in the above-described aspect, in the hierarchical motion-detection step, a motion vector may be detected after expanding a search range as the difference calculated in the calculation step becomes larger.

Furthermore, according to still another aspect, the present invention provides an image processing program for causing a computer to execute: a calculation step of calculating the difference between two images acquired in time series; a number-of-levels setting step of setting a larger number of levels for a partial region that includes a detection pixel at which the difference is larger, on the basis of the difference calculated in the calculation step; and a hierarchical motion-detection step of detecting, for each partial region, a motion vector between the two images by using the number of levels set in the number-of-levels setting step.

Furthermore, according to still another aspect, the present invention provides a non-transitory computer-readable storage medium having recorded an image processing program for causing a computer to execute: a calculation step of calculating the difference between two images acquired in time series; a number-of-levels setting step of setting a larger number of levels for a partial region that includes a detection pixel at which the difference is larger, on the basis of the difference calculated in the calculation step; and a hierarchical motion-detection step of detecting, for each partial region, a motion vector between the two images by using the number of levels set in the number-of-levels setting step.

REFERENCE SIGNS LIST

1 image acquisition device
3 image acquisition element
3a image acquisition unit
4 image processing device
10 motion detection circuit (pixel-value-change detecting unit)
11 image accumulating unit (memory circuit)
14 hierarchical motion-detection unit (hierarchical motion-detection circuit)
15 hierarchical-motion-detection switching unit (hierarchical-motion-detection setting unit, hierarchical motion-detection setting circuit)
18 difference calculating unit (arithmetic circuit)
21 pixel-value-change detecting unit
S4 difference calculating step (calculation step)
S7, S9, S11, S13, S14 number-of-levels setting step
S17 hierarchical motion-detection step
MV1, MV2, MV3, MV4, MV5, MV6, MV7, MV8, MV9 detection pixel
Q1, Q2, Q3, Q4, Q5, Q6, Q7, Q8, Q9 partial region

The invention claimed is:

1. An image acquisition device comprising:
an image acquisition circuit that acquires images of a subject in time series;
a hierarchical motion-detection circuit that detects a motion vector between the images acquired by the image acquisition circuit, by using images at two or more levels having different resolutions;
a pixel-value-change detecting circuit that divides the images acquired by the image acquisition circuit into a plurality of partial regions and that detects a temporal change of a pixel value at a detection pixel set in each of the partial regions; and
a hierarchical-motion-detection setting circuit that increases a number of levels to be used in the hierarchical motion-detection circuit, for any of the partial regions that includes the detection pixel at which the temporal change detected by the pixel-value-change detecting circuit is larger than a predetermined threshold, in accordance with an increase in the temporal change.

2. The image acquisition device according to claim 1, wherein the image acquisition circuit and the pixel-value-change detecting circuit are provided in an image acquisition element.

3. The image acquisition device according to claim 1, wherein the pixel-value-change detecting circuit is provided with:
a memory circuit that stores a one-frame-previous image acquired by the image acquisition circuit; and
an arithmetic circuit that calculates, as the temporal change, a difference between the one-frame-previous image stored in the memory circuit and a current image.

4. The image acquisition device according to claim 1, wherein the hierarchical-motion-detection setting circuit prevents motion detection processing from being performed in the hierarchical motion-detection circuit for any of the partial regions that includes the detection pixel at which the temporal change detected by the pixel-value-change detecting circuit is equal to or less than the predetermined threshold.

5. The image acquisition device according to claim 1, wherein the hierarchical-motion-detection setting circuit expands a search range for the motion detection processing, which is performed in the hierarchical motion-detection circuit, as a magnitude of the temporal change detected by the pixel-value-change detecting circuit becomes larger.

6. An image processing device comprising:
a hierarchical motion-detection circuit that detects a motion vector between images acquired in time series, by using images at two or more levels having different resolutions;
a memory circuit that stores an image acquired one frame before a current image;

an arithmetic circuit that calculates a difference between the image stored in the memory circuit and the current image; and a hierarchical motion-detection setting circuit that increases a number of levels used in the hierarchical motion-detection circuit, for a partial region that includes a detection pixel at which the difference calculated by the arithmetic circuit is larger than a predetermined threshold, in accordance with an increase in the difference.

7. The image processing device according to claim 6, wherein the hierarchical motion-detection setting circuit prevents motion detection processing from being performed in the hierarchical motion-detection circuit for a partial region which includes the detection pixel at which the difference calculated by the arithmetic circuit is equal to or less than the predetermined threshold.

8. The image processing device according to claim 6, wherein the hierarchical motion-detection setting circuit expands a search range for motion detection processing performed in the hierarchical motion-detection circuit as a magnitude of the difference calculated by the arithmetic circuit becomes larger.

9. An image processing method comprising:
 calculating a difference between two images acquired in time series;
 increasing a number of levels set for a partial region that includes a detection pixel at which the calculated difference is larger than a predetermined threshold, in accordance with an increase in the difference; and
 detecting, for each partial region, a motion vector between the two images by using the set number of levels.

10. The image processing method according to claim 9, wherein, in the detecting, the motion vector is detected after excluding a partial region which includes the detection pixel at which the calculated difference is equal to or less than the predetermined threshold.

11. The image processing method according to claim 9, wherein, in the detecting, the motion vector is detected after expanding a search range as the calculated difference becomes larger.

12. A non-transitory computer-readable storage medium having recorded thereon an image processing program for causing a computer to execute processes comprising:
 calculating a difference between two images acquired in time series;
 increasing a number of levels set for a partial region that includes a detection pixel at which the calculated difference is larger, than a predetermined threshold, in accordance with an increase in the difference; and
 detecting, for each partial region, a motion vector between the two images by using the set number of levels.

* * * * *